United States Patent Office 3,337,558
Patented Aug. 22, 1967

3,337,558
PREPARATION OF HOMOVERATRYLAMIDES
Harry Tacon Openshaw and Norman Whittaker, London, England, assignors to Burroughs Wellcome & Co. (U.S.A.) Inc., New York, N.Y., a corporation of New York
No Drawing. Filed Mar. 17, 1965, Ser. No. 440,635
Claims priority, application Great Britain, Mar. 20, 1964, 11,808/64
8 Claims. (Cl. 260—287)

This invention relates to the preparation of amides, and in particular to the preparation of homoveratrylamides.

The conversion of a derivative of a substituted benzo(a)quinolizine of the general Formula Ia or Ib, having a reactive group substituted for X, into a corresponding homoveratrylamide of Formula IIa or IIb, is an important step in the synthesis of emetine (IIIa) or 2-dehydro-emetine (IIIb), or homologues thereof. Both emetine and 2-dehydro-emetine are drugs used in the treatment of amoebiasis.

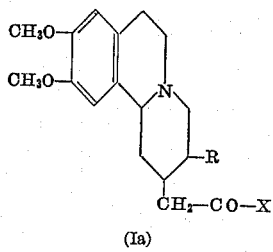
(Ia)

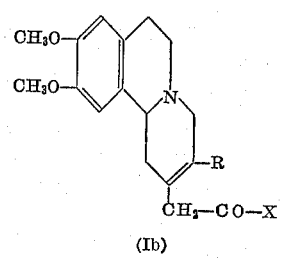
(Ib)

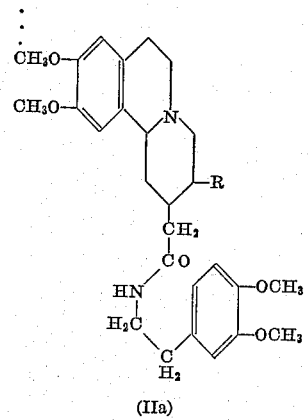
(IIa)

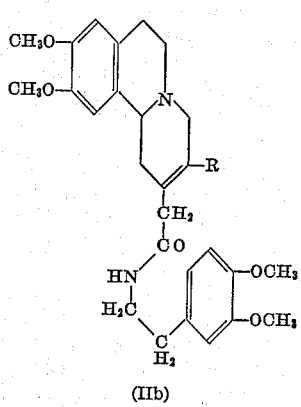
(IIb)

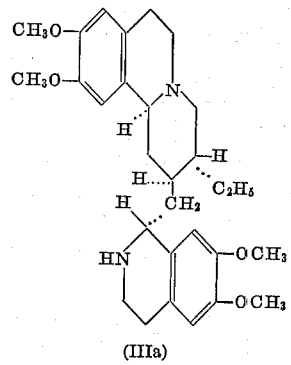
(IIIa)

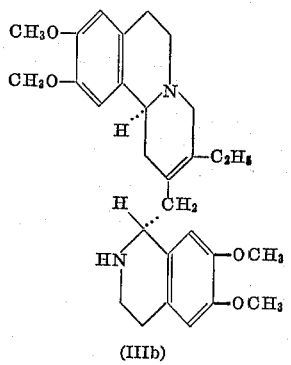
(IIIb)

In these and subsequent Formulae R is a lower alkyl group having from 1 to 4 carbon atoms.

Hitherto the efficient conversion of compounds (Ia) and (Ib) into the homoveratrylamides (IIa) and (IIb) has required that the reactive group X should be a chloride or a hydroxide. A direct condensation of the ethyl esters (Ia; X=OEt) and (Ib; X=OEt), which are available through the processes described in the specification of British co-pending application No. 39,935/59, now British Patent No. 999,092 and of British application No. 11,-809/64 which is equivalent to U.S. patent application Ser. No. 440,609, filed on Mar. 17, 1965, of even date, with homoveratrylamine has not hitherto produced the desired products in a satisfactory yield.

It has now been found that the condensation of a lower alkyl ester of a compound corresponding to Formula Ia or Ib, and in particular that of the ethyl ester (X=OEt), with homoveratrylamine to form a compound of the Formula IIa or IIb, can advantageously be catalyzed by the use of a bifunctional catalyst, and the desired amide can thereby be obtained in a yield substantially higher than the yield without such a catalyst. Suitable bifunctional catalysts are organic compounds having both a weakly basic and a weakly acidic group in close proximity in the molecule.

Those bifunctional catalysts, which are aromatic heterocyclic compounds having in one of their tautomeric forms a hydroxy group substituted on a carbon atom adjacent in the ring to a nitrogen atom, have been found particularly advantageous. Examples for such catalysts are 2-hydroxypyridine (2-pyridone), 2-hydroxy-quinoline (2-quinolone), 2-hydroxy-4,6 - dimethyl-pyrimidine (4,6-dimethyl-2-pyrimidone), 4-hydroxy-2-methyl-pyrimidine (2-methyl-2-pyrimidone), 3,6-dihydroxy-pyridazine (maleic hydrazide), 5-hydroxy - 3 - methyl-pyrazole (3-methyl-5-pyrazolone) and 2,4,6-trihydroxy -1,3,5-triazine (cyanuric acid).

When the appropriate optically active stero-isomeric forms of the esters (Ia) and (Ib) are employed in the present method, no racemisation or inversion of configuration takes place, and the resulting homoveratrylamides (IIa) and (IIb) are suitable for further transformation into the optically active (—)-emetine or (—)-2-dehydro-emetine, respectively, or homologues thereof, of the stereochemical composition shown in Formulae IIIa and IIIb, which are the only isomers having a high amoebicidal activity.

For example the optically active (—)-enantiomers actually depicted by Formula IVa or IVb can be used as the starting material and a condensation according to the present invention yields the optically active enantiomer actually depicted by Formula Va or Vb.

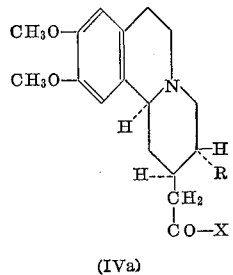

(IVa)

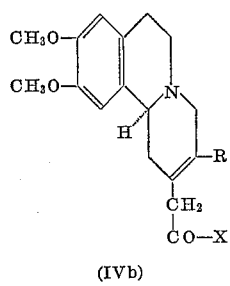

(IVb)

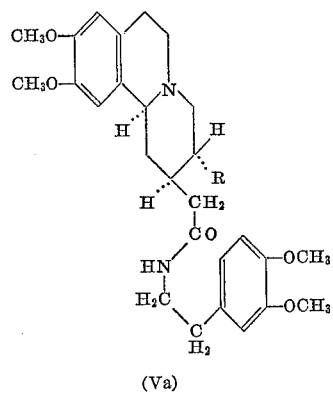

(Va)

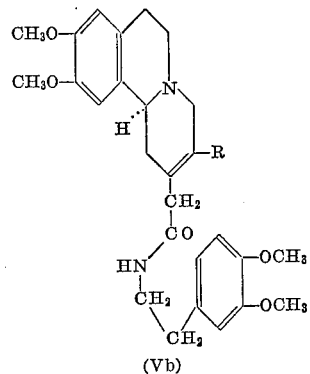

(Vb)

Advantageously the condensation may be carried out at elevated temperatures, preferably between 140° C. and 170° C., under an inert gas atmosphere, such as nitrogen, and the product may subsequently be separated or crystallised.

The optically active or racemic homoveratrylamides produced according to the present invention may then conveniently be cyclised into O-methylpsychotrine or 2-dehydro-O-methylpsychotrine, and reduced into the corresponding emetine or 2-dehydro-emetine, for instance by the method described in the specifications of British Patents 798,847 and 895,910.

According to the present invention therefore there is provided a method for the production of a 3-lower alkyl-1,2,3,4,6,7 - hexahydro - 9,10-dimethoxy-11bH-benzo(a) quinolizine-2-acetic acid homoveratrylamide of Formula IIa, or a 3-lower alkyl-1,4,6,7-tetrahydro-9,10-dimethoxy-11bH - benzo(a)quinolizine - 2-acetic acid homoveratrylamide of Formula IIb, respectively, in which a compound of Formula Ia or Ib, respectively, wherein X is a lower alkoxy group having 1 to 4 carbon atoms, is condensed with homoveratrylamine in the presence of a bifunctional catalyst, as hereinbefore defined.

In a particular aspect there is provided a method in which an optically active enantiomer of the ester actually depicted by Formula IVa or IVb, wherein X is an aforesaid alkoxy group, is condensed with homoveratrylamine in the presence of the bifunctional catalyst to form the corresponding optically active enantiomer of the amide of Formula Va or Vb, respectively.

In the following examples, Examples 1, 2 and 6 illustrate the process without catalyst and Examples 3 to 5 and 7 to 19 illustrate the process according to the invention.

Example 1

(—) - 2 - ethoxycarbonylmethyl - 3-ethyl-1,2,3,4,6,7-hexahydro - 9,10 - dimethoxy - 11bH-benzo[a]quinolizine (IVa; R=Et, X=OEt) (1 g.) and homoveratrylamine (1.2 g.) were heated together, under nitrogen, in a bath at 190° C. for 3 hours. The cooled gum was heated with water (30 ml.) at approx. 70° C. and the resulting suspension of crystals was cooled and filtered, giving 1.09 g., M.P. 130–156° C. of a mixture of the starting material with the homoveratrylamide (Va; R=Et). This mixture was boiled with diethylether (25 ml.), cooled, and filtered, yielding 0.60 g. (44%), M.P. 168–171° C. of (—)-3-ethyl - 1,2,3,4,6,7 - hexahydro - 9,10 - dimethoxy - 11bH-benzo(a)quinolizine - 2 - acetic acid homoveratrylamide (Va; R=Et). Evaporation of the ethereal filtrate and crystallisation of the residue from petroleum (B.P. 60–80° C.) gave 0.41 g., M.P. 89–90° C., of recovered ester.

Example 2

When the quantities of reagents used in Example 1 were heated in a bath at 225° C. for 2½ hours, the homoveratrylamide (0.87 g., 63%) M.P. 167–170° C., which resulted, was somewhat discoloured by impurities.

Example 3

A mixture of (—)-2-ethoxycarbonylmethyl-3-ethyl-1,2,3,4,6,7 - hexahydro - 9,10 - dimethoxy-11bH-benzo[a] quinolizine (IVa; R=Et; X=OEt) (2.5 g.), homoveratrylamine (3.0 g.), and 2-hydroxypyridine (0.5 g.) was heated, under nitrogen, in a bath at 160° C. for 5 hours. The cooled gum was heated with water (60 ml.) to approx. 70° C., and the resulting suspension of colourless needles was cooled, shaken with diethyl-ether (20 ml.) and filtered, giving 2.89 g. (84%), M.P. 170–172°, of pure (—) - 3-ethyl-1,2,3,4,6,7-hexahydro-9,10-dimethoxy-11bH - benzo(a)quinolizine - 2-acetic acid homoveratrylamide (Va; R=Et). In addition 9% of the ester was recovered.

Example 4

A mixture of (—)-2-ethoxycarbonylmethyl-3-ethyl-1,4,6,7 - tetrahydro - 9,10 - dimethoxy-11bH-benzo[a]quinolizine (IVb; R=Et; X=OEt) (1.60 g.), homoveratrylamine (1.99 g.) and 2-hydroxypyridine (0.33 g.) was heated, under nitrogen in a bath at 165° C. for 5 hours. The cooled gum was seeded and stirred with water (20 ml.) and diethyl-ether (10 ml.), and the resulting suspension of colourless needles was set aside overnight and filtered, giving 1.685 g. (77%), M.P. 157–159° C., $[\alpha]_D^{25}$ —185° (c.=1 in MeOH), of (—)-3-ethyl-1,4,6,7-tetrahydro - 9,10-dimethoxy-11bH-benzo(a)quinolizine-2-acetic acid homoveratrylamide (Vb; R=Et).

Example 5

Reaction of racemic 2-ethoxycarbonylmethyl-3-ethyl-1,4,6,7 - tetrahydro - 9,10 - dimethoxy - 11bH-benzo(a)quinolizine (Ib; X=OEt; R=Et) with homoveratrylamine in the presence of 2-hydroxypyridine in the manner described for the (—)-enantiomer in Example 4, gave the racemic 3-ethyl-1,4,6,7-tetrahydro-9,10-dimethoxy-11bH-benzo(a)quinolizine - 2 - acetic acid homoveratrylamide (IIb; R=Et), M.P. 151–152° C., in a 76% yield.

Example 6

(—)-2-ethoxycarbonylmethyl - 3 - ethyl - 1,2,3,4,6,7-hexahydro - 9,10 - dimethoxy-11bH-benzo(a)quinolizine (IVa; R=Et; X=OEt) (0.50 g.) and homoveratrylamine (0.60 g.=2.4 mols.) were heated together, under nitrogen, in a bath at 169° for 5 hours. The cooled reaction product was stirred with water (8 ml.) and ether (3 ml.) and the mixture was set aside for several hours to give 0.015 g. (2.2%), M.P. 171–173° C., $[\alpha]_D^{24}$ —19° (c.=1 in EtOH), of (—)-3-ethyl-1,2,3,4,6,7-hexahydro-9,10 - dimethoxy - 11bH - benzo(a)quinolizine-2-acetic acid homoveratrylamide (Va; R=Et).

When the procedure of Example 6 was repeated, but in the presence of three quarters of a molecular proportion of one of the following catalysts, the yields of the homoveratrylamide (Va; R=Et) were as follows:

| Catalyst: | Yield, percent |
|---|---|
| Example 7—2-hydroxypyridine | 87 |
| Example 8—2-hydroxy-4,6-dimethylpyrimidine | 83 |
| Example 9—4-hydroxy-2-methylpyrimidine | 66 |
| Example 10—5-hydroxy-3-methylpyrazole | 79 |
| Example 11—2,6-dihydroxypyridazine | 63 |
| Example 12—2-hydroxyquinoline | 43 |
| Example 13—2,4,6-trihydroxy-1,3,5-triazine | 26 |
| Example 14—1,2,4-triazole | 44 |
| Example 15—Imidazole | 12 |
| Example 16—3,5-dimethylpyrazole | 12 |
| Example 17—8-hydroxyquinoline | 11 |
| Example 18—Succinimide | 20 |

Example 19

When racemic 2-ethoxycarbonylmethyl - 1,4,6,7-tetrahydro - 9,10 - dimethoxy - 3 - methyl - 11bH-benzo(a)quinolizine (Ib; X=OEt; R=Me) was heated with homoveratrylamine in the presence of 2-hydroxypyridine in the manner of Example 4, a 75% yield of 1,4,6,7-tetrahydro-9,10 - dimethoxy - 3 - methyl-11bH-benzo(a)quinolizine-2-acetic acid homoveratrylamide (IIb; R=Me), M.P. 139–140° C., was obtained.

What we claim is:

1. A method for the production of compounds selected from the class consisting of Formula IIa and Formula IIb

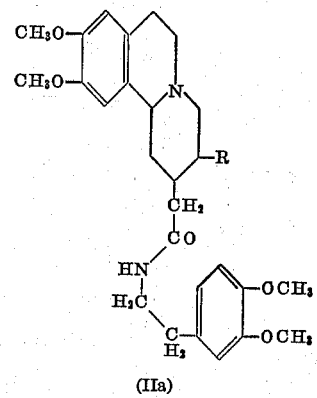

(IIa)

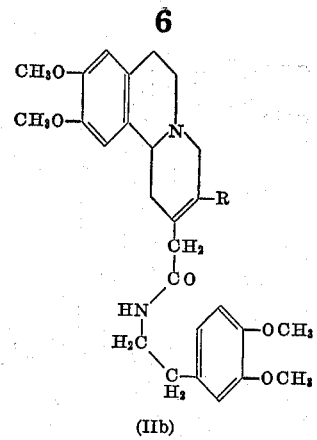

(IIb)

in which compounds selected from the class consisting of Formulas Ia and Ib respectively,

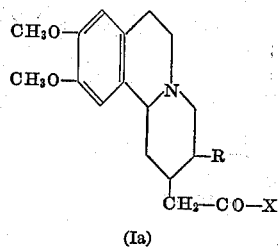

(Ia)

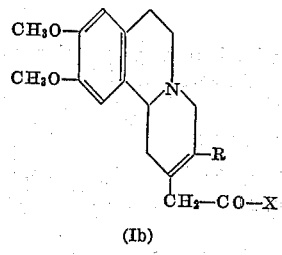

(Ib)

are condensed with homoveratrylamine characterized by the presence of a catalyst selected from the class consisting of 2-hydroxy-pyridine, 2-hydroxy-4,6-dimethyl-pyrimidine and 5-hydroxy-3-methyl-pyrazole, and wherein R is selected from the class consisting of methyl and ethyl and X is selected from the class consisting of methoxy and ethoxy.

2. A method according to claim 1, in which the condensation is carried out at a temperature of about 140° C. to about 170° C.

3. A method for the production of compounds selected from the class consisting of Formula IIa and Formula IIb

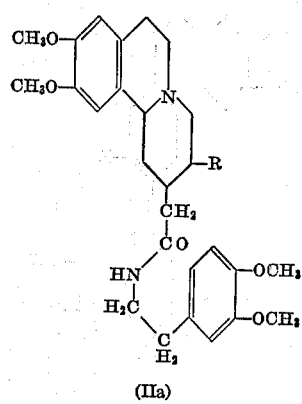

(IIa)

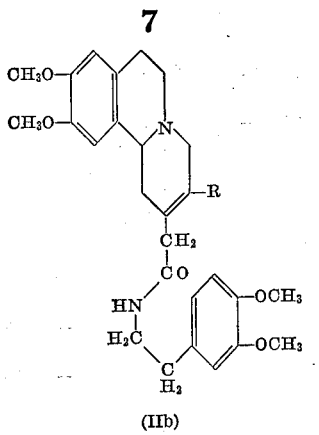

(IIb)

in which compounds selected from the class consisting of Formulas Ia and Ib, respectively,

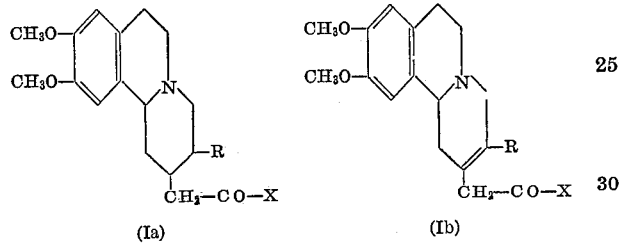

(Ia)  (Ib)

are condensed with homoveratrylamine characterized by the presence of 2-hydroxy-pyridine, and wherein R is selected from the class consisting of methyl and ethyl and X is selected from the class consisting of methoxy and ethoxy.

4. A method for the production of compounds selected from the class consisting of Formula IIa and Formula IIb

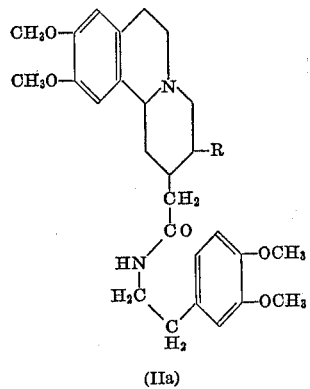

(IIa)

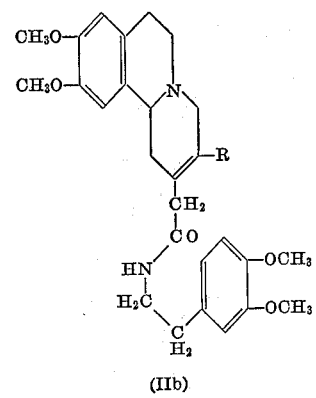

(IIb)

in which compounds selected from the class consisting of Formulas Ia and Ib, respectively,

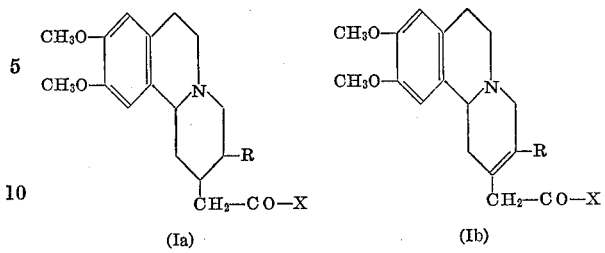

(Ia)  (Ib)

are condensed with homoveratrylamine characterized by the presence of 2-hydroxy-4,6-dimethyl-pyrimidine, and wherein R is selected from the class consisting of methyl and ethyl and X is selected from the class consisting of methoxy and ethoxy.

5. A method for the production of compounds selected from the class consisting of Formula IIa and Formula IIb

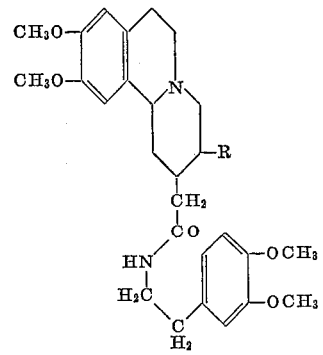

(IIa)

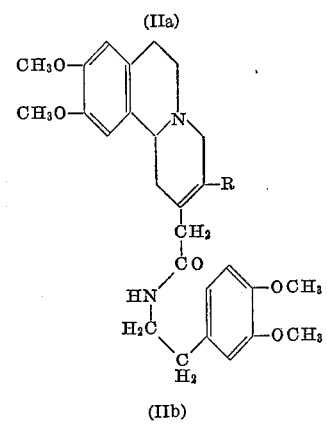

(IIb)

in which compounds selected from the class consisting of Formulas Ia and Ib, respectively,

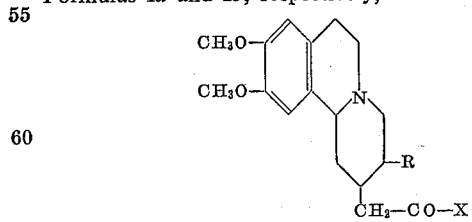

(Ia)

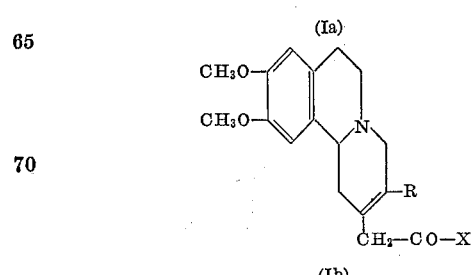

(Ib)

are condensed with homoveratrylamine characterized by the presence of 5-hydroxy-3-methylpyrazole, and wherein R is selected from the class consisting of methyl and ethyl and X is selected from the class consisting of methoxy and ethoxy.

6. A method for the production of compounds selected from the class consisting of 3-ethyl-1,2,3,4,6,7-hexahydro-9,10-dimethoxy-11bH-benzo(a) quinolizine - 2 - acetic acid and homoveratrylamide and 3-ethyl-1,4,6,7-tetrahydro - 9,10 - dimethoxy - 11bH - benzo(a)quinolizine-2-acetic acid and homoveratrylamide, in which a compound selected from the class consisting of 2-lower alkoxycarbonyl - methyl - 3 - ethyl - 1,2,3,4,6,7-hexahydro-9,10-dimethoxy - 11bH - benzo(a)quinolizine and 2-lower alkoxycarbonyl-methyl - 3 - ethyl - 1,4,6,7-tetrahydro-9,10 - dimethoxy - 11bH - benzo(a)quinolizine is condensed with a homoveratrylamine chracterized by the presence of a catalytic aromatic heterocyclic ring compound selected from the class having 1 to 2 rings and having at least one nitrogen atom in the ring with the remaining members of the ring being carbon atoms, and wherein the ring compound has in one of its tautomeric forms a hydroxy group substituted on a carbon atom adjacent in the ring to a nitrogen atom.

7. A method according to claim 6, wherein the catalytic compound is selected from the class consisting of 2-hydroxypyridine, 2-hydroxy-quinoline, 2-hydroxy-4,5,dimethylpyrimidine, 4-hydroxy-2-methylpyrimidine, 3,6-dihydroxy - pyridazine, 5 - hydroxy-3-methyl-pyrazole and 2,4,6-trihydroxy-triazine.

8. A method of preparing compounds Z-9-10-dimethoxy - 3 - methyl - 11bH - benzo(a)quinolizine-2-acetic acid homoveratrylamide, wherein Z is selected from the class consisting of 1,4,6,7-tetrahydro and 1,2,3,4,6,7-hexahydro, in which a compound from the class consisting of 2 - ethoxycarbonyl - Z - 9,10 - dimethoxy - 3 - methyl-11bH-benzo(a)quinolizine, wherein Z is as defined above, condensed with a homoveratrylamine characterized by the presence of a catalytic aromatic heterocyclic ring compound selected from the class having 1 to 2 rings and having at least one nitrogen atom in the ring with the remaining members of the ring carbon atoms, and wherein the ring compounds have in one of their tautomeric forms a hydroxy group substituted on a carbon atom adjacent in the ring to a nitrogen atom.

References Cited
UNITED STATES PATENTS

| 2,877,226 | 3/1959 | Brossi et al. | 260—287 |
| 3,045,020 | 7/1962 | Battersby | 260—287 |

ALEX MAZEL, *Primary Examiner.*

HENRY R. JILES, *Examiner.*

D. G. DAUS, *Assistant Examiner.*